United States Patent
Kilchyk et al.

(10) Patent No.: US 12,497,176 B1
(45) Date of Patent: Dec. 16, 2025

(54) POWERED TURBO-EXPANDER COMBINING CENTRIFUGAL COMPRESSOR AND AN AXIAL FLOW TURBINE

(71) Applicant: Hamilton Sundstrand Corporation, Charlotte, NC (US)

(72) Inventors: Viktor Kilchyk, Lancaster, NY (US); Mark G. Vignali, Simsbury, CT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 0 days.

(21) Appl. No.: 18/742,456

(22) Filed: Jun. 13, 2024

(51) Int. Cl.
*B64D 13/08* (2006.01)
*F04D 17/10* (2006.01)
*F04D 19/00* (2006.01)
*B64D 13/06* (2006.01)

(52) U.S. Cl.
CPC ............ *B64D 13/08* (2013.01); *F04D 17/10* (2013.01); *F04D 19/00* (2013.01); *B64D 2013/0618* (2013.01); *B64D 2013/064* (2013.01); *B64D 2013/0688* (2013.01)

(58) Field of Classification Search
CPC .................. B64D 13/08; B64D 2013/0618
See application file for complete search history.

(56) References Cited

U.S. PATENT DOCUMENTS

| | | | |
|---|---|---|---|
| 5,490,645 A | 2/1996 | Woodhouse | |
| 6,415,621 B2 | 7/2002 | Buchholz et al. | |
| 9,527,594 B2 | 12/2016 | Army | |
| 9,879,610 B2 * | 1/2018 | Moes | B64D 13/08 |
| 10,137,993 B2 | 11/2018 | Bruno et al. | |
| 10,179,309 B2 * | 1/2019 | Rheaume | F24F 3/1405 |
| 10,850,853 B2 * | 12/2020 | Bruno | F25B 9/10 |
| 10,953,992 B2 | 3/2021 | Bruno et al. | |
| 11,077,949 B2 | 8/2021 | Behrens et al. | |
| 11,358,725 B2 * | 6/2022 | Bruno | B64D 13/06 |
| 2015/0086396 A1 | 3/2015 | Nasir | |
| 2019/0283898 A1 * | 9/2019 | D'Orlando | B64D 13/08 |
| 2019/0366803 A1 | 12/2019 | Harris | |
| 2023/0069975 A1 * | 3/2023 | Quartarone | H01M 8/22 |

OTHER PUBLICATIONS

Nicoara et al. "Axial turbine performance estimation during dynamic operations" International Journal of Aeronautical and Space Sciences 22.2 (Apr. 2021) pp. 359-365.

* cited by examiner

*Primary Examiner* — Michael L Sehn
(74) *Attorney, Agent, or Firm* — CANTOR COLBURN LLP

(57) ABSTRACT

An environmental control system (ECS) of an aircraft, having a heat exchanger; a compressor that receives a first airflow from a first air source, compresses the first airflow, and directs the first airflow to the heat exchanger; an axial flow turbine that receives a second airflow from a second air source, extracts energy from the second airflow, and directs the second airflow to the heat exchanger, wherein the heat exchanger directs the first airflow to a cabin of the aircraft and directs the second airflow overboard; and a shaft connected between the turbine and the compressor.

3 Claims, 3 Drawing Sheets

POWERED TURBO-EXPANDER COMBINING CENTRIFUGAL COMPRESSOR AND AN AXIAL FLOW TURBINE

BACKGROUND

The embodiments are directed to an environmental control system (ECS) for an aircraft and more specifically to a powered turbo-expander combining centrifugal compressor and an axial flow turbine.

Aircraft utilize environmental control systems (ECS) to provide conditioned and pressurized air to a cabin and cockpit. Certain aircraft may utilize high energy pressurized bleed air from the aircraft engine to power an ECS turbine. Other aircraft, such as military, commercial, and supersonic aircraft, may power the ECS turbine utilizing air from sources other than, or in addition to, the engine, such as a mixture of engine bleed air and RAM air. In these configurations, operational conditions of the ECS turbine, including the specific speed, may be outside of the target design range for the turbine, leading to poor efficiency.

BRIEF DESCRIPTION

Disclosed is an environmental control system (ECS) of an aircraft, including a heat exchanger; a compressor that receives a first airflow from a first air source, compresses the first airflow, and directs the first airflow to the heat exchanger; an axial flow turbine that receives a second airflow from a second air source, extracts energy from the second airflow, and directs the second airflow to the heat exchanger, wherein the heat exchanger directs the first airflow to a cabin of the aircraft and directs the second airflow overboard; and a shaft connected between the turbine and the compressor.

In addition to one or more aspects of the ECS or as an alternate, the compressor is a centrifugal compressor, an axial flow compressor, or a mixed flow compressor.

In addition to one or more aspects of the ECS or as an alternate, the ECS includes a motor connected to the shaft.

In addition to one or more aspects of the ECS or as an alternate, the ECS includes a first conduit coupled between the first air source and the compressor to direct the first airflow to the compressor; a second conduit coupled between the compressor and the heat exchanger to direct the first airflow from the compressor to the heat exchanger; a third conduit coupled between the second air source and the turbine to direct the second airflow to the turbine; a fourth conduit coupled between the turbine and the heat exchanger to direct the second airflow to the heat exchanger; a fifth conduit coupled to the heat exchanger to direct the first airflow from the heat exchanger to the cabin; and a sixth conduit coupled to the heat exchanger to direct the second airflow overboard.

In addition to one or more aspects of the ECS or as an alternate, the third conduit includes a first branch coupled to the turbine and a second branch coupled to the fourth conduit; and the ECS includes a first valve in the second branch of the third conduit so that the second branch is a turbine bypass branch.

In addition to one or more aspects of the ECS or as an alternate, the ECS includes a seventh conduit extending from the first conduit to the fifth conduit, wherein a connection between the first and seventh conduits, located between the first air source and the compressor, defines a flow joint; the first conduit, between the compressor and the flow joint, includes a second valve and the seventh conduit includes a third valve.

In addition to one or more aspects of the ECS or as an alternate, the first air source is RAM air.

In addition to one or more aspects of the ECS or as an alternate, the first air source is engine bleed air.

In addition to one or more aspects of the ECS or as an alternate, the first air source is a mixture of RAM air and engine bleed air.

In addition to one or more aspects of the ECS or as an alternate, the second air source is RAM air.

In addition to one or more aspects of the ECS or as an alternate, the second air source is engine bleed air.

In addition to one or more aspects of the ECS or as an alternate, the second air source is recirculated cabin air.

An environmental control system (ECS) of an aircraft, including: a heat exchanger; a compressor that receives a first airflow from a first air source, compresses the first airflow, and directs the first airflow to the heat exchanger, wherein the compressor is a centrifugal compressor, an axial flow compressor, or a mixed flow compressor; a turbine that receives a second airflow from a second air source, extracts energy from the second airflow, and directs the second airflow to the heat exchanger, wherein the heat exchanger directs the first airflow to a cabin of the aircraft and directs the second airflow overboard; and a shaft connected between the turbine and the compressor.

In addition to one or more aspects of the ECS or as an alternate, the turbine is an axial flow turbine.

Disclosed is an environmental control system (ECS) of an aircraft, including: a heat exchanger; a compressor that receives a first airflow from a first air source that is RAM air, bleed air or a mixture of RAM air and bleed air, compresses the first airflow, and directs the first airflow to the heat exchanger, wherein the compressor is a centrifugal compressor, an axial flow compressor, or a mixed flow compressor; an axial flow turbine that receives a second airflow from a second air source that is RAM air, bleed air or recirculated cabin air, extracts energy from the second airflow, and directs the second airflow to the heat exchanger, wherein the heat exchanger directs the first airflow to a cabin of the aircraft and directs the second airflow overboard; and a shaft connected between the turbine and the compressor.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus are presented herein by way of exemplification and not limitation with reference to the Figures.

Figure 1:
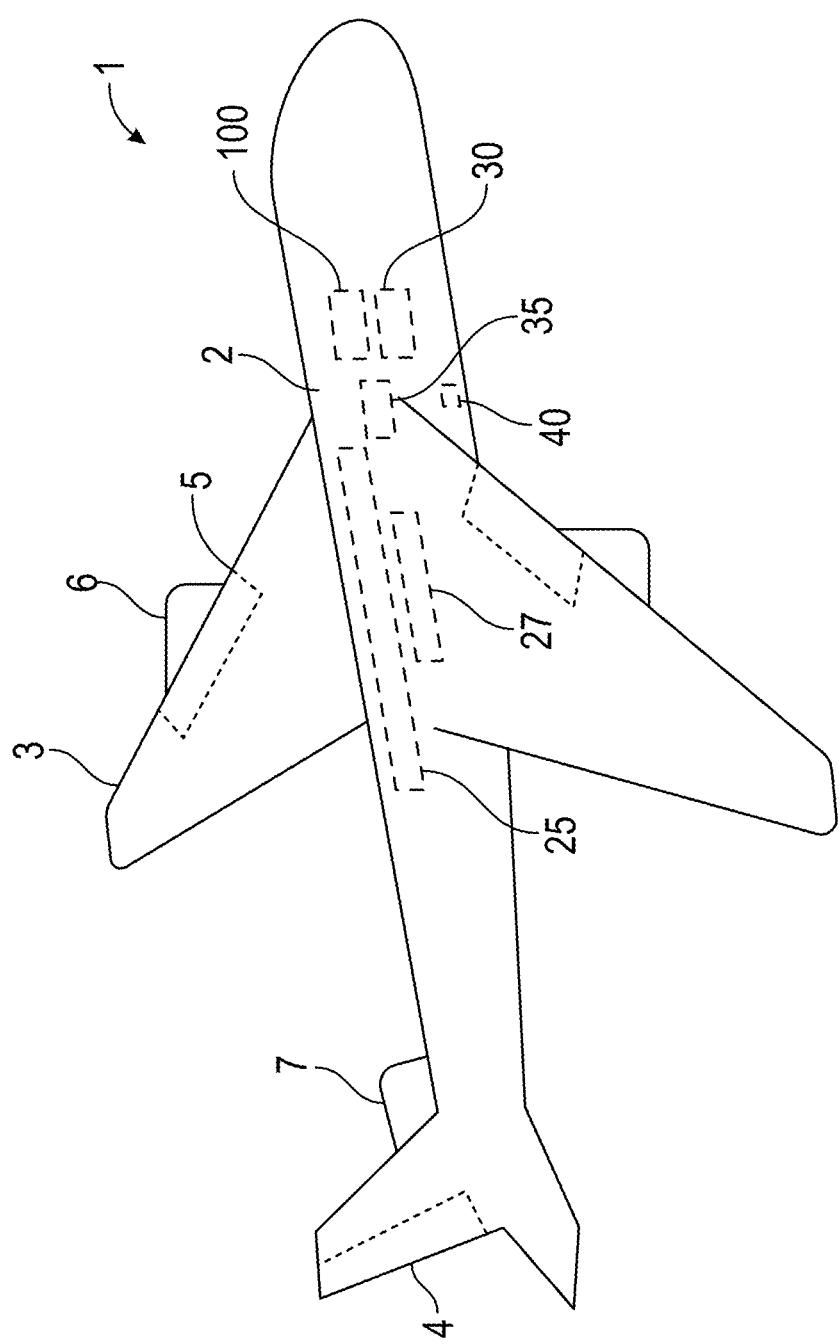
FIG. 1 shows an aircraft that may utilized an environmental control system (ECS) according to an embodiment.

FIG. 1 shows an aircraft 1 having a fuselage 2 with a wing 3 and tail assembly 4, which may have control surfaces 5. The wing 3 may include an engine 6, such as a gas turbine engine, and an auxiliary power unit 7 may be disposed at the tail assembly 4. The aircraft 1 may have a cabin 25, a cargo bay 27, an environmental control system (ECS) 100 for conditioning the cabin 25 and/or cargo bay 27, and a vapor compression system (VCS) or other related implements 30 that provide refrigeration to one or more systems 35 of the aircraft 1. A RAM air inlet 40 may scoop air for the ECS 30.

Figure 2:
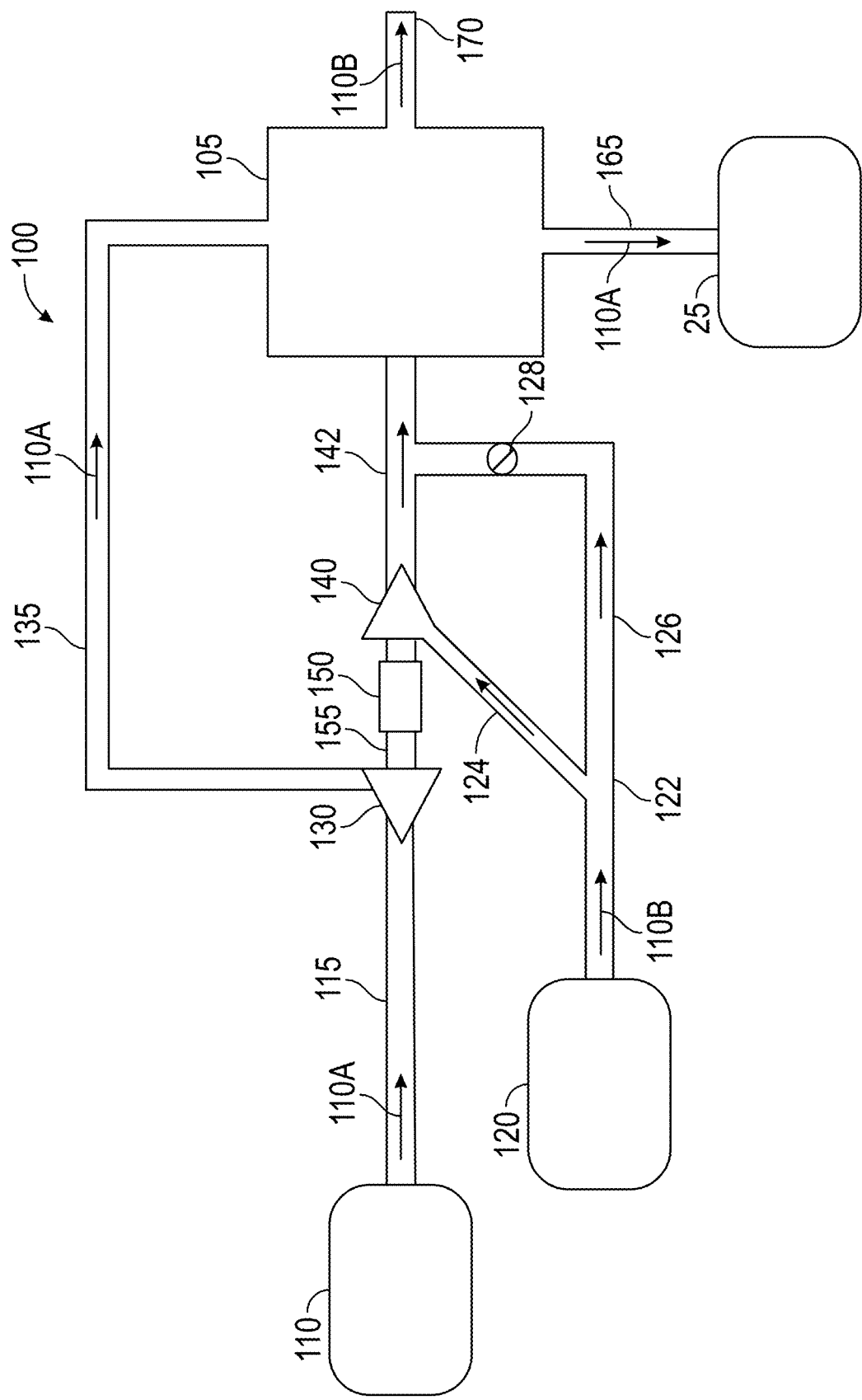
FIG. 2 shows an ECS according to an embodiment.

As shown in FIG. 2, the ECS 100 may include a heat exchanger 105. A compressor 130 receives a first airflow 110A from a first air source 110, compresses the first airflow 110A, and directs the first airflow 110A to the heat exchanger 105. An axial flow turbine 140 (or turboexpander) receives a second airflow 110B from a second air source 120, extracts energy from the second airflow 110B, and directs the second airflow 110B to the heat exchanger 105. The heat exchanger 105 directs the first airflow 110A to the cabin 25 of the aircraft 1 and directs the second airflow 110B overboard.

The turbine 140 may be a single stage or a multistage (e.g., two or three stages) axial flow turbine. The turbine 140 may be designed with a dual inlet entry, which may allow for higher operational efficiency. Utilizing the axial flow turbine 140 will provide a more efficient operation than, e.g., utilizing a radial turbine, as the axial flow turbine 140 provides better performance in terms of converting energy from a flow to mechanical output. For example, an axial flow turbine 140 outputs a relatively smooth flow of air, resulting in improved efficiency. Further, with the axial flow turbine 140, thermal protection is easier to obtain as compared with a mixed flow or radial turbine.

The compressor 130 may be a centrifugal compressor, an axial flow compressor, or a mixed flow compressor. Such compressor 130 may increase the overall operating efficiency of the ECS 100 due to its higher specific speed when operating at its peak design efficiency. Further, utilizing the axial flow turbine 140 with the radial flow compressor 130 saves weight and space compared to utilizing a dual radial turbine and radial compressor configuration.

A shaft 155 is connected between the turbine 140 and the compressor 130, e.g., to drive the compressor 130. In one embodiment, a motor 150 is connected to the shaft 155 to drive the turbine 140 and compressor 130, e.g., at low aircraft speeds.

As indicated, the embodiments herein provide powered turbo-expander. The turbo-expander combines a centrifugal compressor 130 and an axial flow turbine 140, in one embodiment.

A first conduit 115 is coupled to between the first air source 110 and compressor 130 to direct the first airflow 110A to the compressor 130. A second conduit 135 is coupled between the compressor 130 and the heat exchanger 105 to direct the first airflow 110A from the compressor 130 to the heat exchanger 105. A third conduit 122 is coupled between the second air source 120 and the turbine 140 to direct the second airflow 110B to the turbine 140. A fourth conduit 142 is coupled between the turbine 140 and the heat exchanger 105 to direct the second airflow 110B to the heat exchanger 105. A fifth conduit 165 is coupled between the heat exchanger 105 and the cabin 25 to direct the first airflow 110A from the heat exchanger 105 to the cabin 25. A sixth conduit 170 is coupled to the heat exchanger 105 to direct the second airflow 110B overboard. As can be appreciated the heat exchanger 105 may be a cross flow heat exchanger to transfer heat energy from the first airflow 110A to the second airflow 110B.

In one embodiment, the third conduit 122 includes a first branch 124 coupled to the turbine 140 and a second branch 126 coupled to the fourth conduit 142. A (first) valve 128 is coupled to the second branch 126 of the third conduit 122 so that the second branch 126 is a turbine bypass branch.

In one embodiment the first air source 110 of the first airflow 110A is RAM air, e.g., from the RAM air inlet 40. In one embodiment the first source 110 of the first airflow 110A is engine bleed air, e.g., from the engine 6. In one embodiment the first source 110 of the first airflow 110A is a mixture of RAM air and engine bleed air.

In one embodiment, the second air source 120 of the second airflow 110B is RAM air, e.g., from the RAM air inlet 40. In one embodiment, the second source 120 of the second airflow 110B is engine bleed air, e.g., from the engine 6. In one embodiment, the second source 120 of the second airflow 110B is recirculated cabin air, e.g., from the cabin 25.

Figure 3:
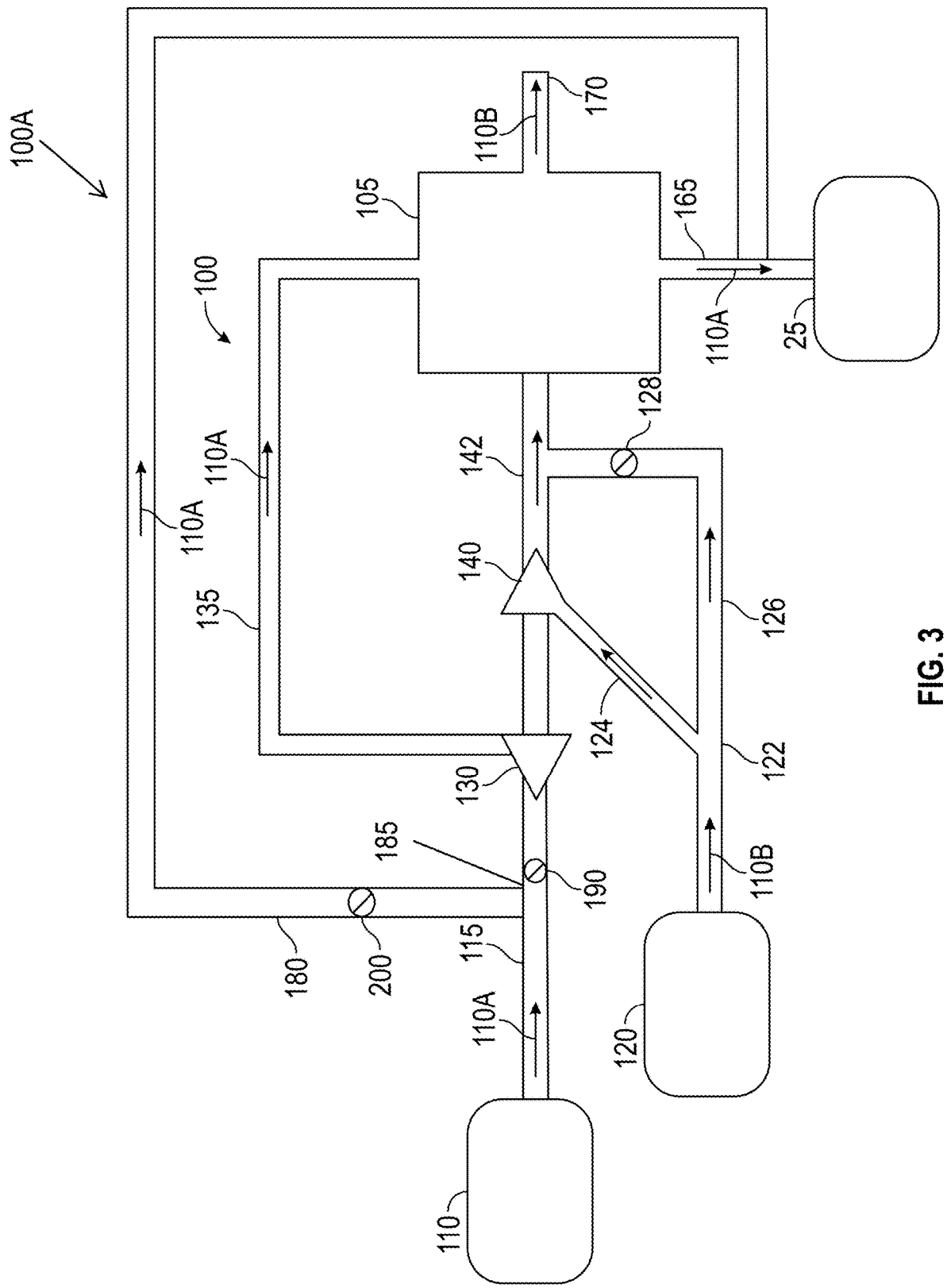
FIG. 3 shows an ECS according to another embodiment.

As shown in FIG. 3, the ECS 100A according to another embodiment may include a heat exchanger 105. A compressor 130 receives a first airflow 110A from a first air source 110, compresses the first airflow 110A, and directs the first airflow 110A to the heat exchanger 105. An axial flow turbine 140 (or turboexpander) receives a second airflow 110B from a second air source 120, extracts energy from the second airflow 110B, and directs the second airflow 110B to the heat exchanger 105. The heat exchanger 105 directs the first airflow 110A to the cabin 25 of the aircraft 1 and directs the second airflow 110B overboard.

The turbine 140 may be a single stage or a multistage (e.g., two or three stages) axial flow turbine. The turbine 140 may be designed with a dual inlet entry, which may allow for higher operational efficiency. Utilizing the axial flow turbine 140 will provide a more efficient operation than, e.g., utilizing a radial turbine, as the axial flow turbine 140 provides better performance in terms of converting energy from a flow to mechanical output. For example, an axial flow turbine 140 outputs a relatively smooth flow of air, resulting in improved efficiency. Further, with the axial flow turbine 140, thermal protection is easier to obtain as compared with a mixed flow or radial turbine.

The compressor 130 may be a centrifugal compressor, an axial flow compressor, or a mixed flow compressor. Such compressor 130 may increase the overall operating efficiency of the ECS 100 due to its higher specific speed when operating at its peak design efficiency. Further, utilizing the axial flow turbine 140 with the radial flow compressor 130 saves weight and space compared to utilizing a dual radial turbine and radial compressor configuration.

A shaft 155 is connected between the turbine 140 and the compressor 130. The shaft 155 enables the turbine 150 to drive the compressor 130.

As indicated, the embodiments herein provide powered turbo-expander. The turbo-expander combines a centrifugal compressor 130 and an axial flow turbine 140, in one embodiment.

A first conduit 115 is coupled to between the first air source 110 and compressor 130 to direct the first airflow 110A to the compressor 130. A second conduit 135 is coupled between the compressor 130 and the heat exchanger 105 to direct the first airflow 110A from the compressor 130 to the heat exchanger 105. A third conduit 122 is coupled between the second air source 120 and the turbine 140 to direct the second airflow 110B to the turbine 140. A fourth conduit 142 is coupled between the turbine 140 and the heat exchanger 105 to direct the second airflow 110B to the heat exchanger 105. A fifth conduit 165 is coupled between the heat exchanger 105 and the cabin 25 to direct the first airflow 110A from the heat exchanger 105 to the cabin 25. A sixth conduit 170 is coupled to the heat exchanger 105 to direct the second airflow 110B overboard. As can be appreciated the heat exchanger 105 may be a cross flow heat exchanger to transfer heat energy from the first airflow 110A to the second airflow 110B.

In one embodiment, the third conduit 122 includes a first branch 124 coupled to the turbine 140 and a second branch 126 coupled to the fourth conduit 142. A first valve 128 is coupled to the second branch 126 of the third conduit 122 so that the second branch 126 is a turbine bypass branch.

In one embodiment, a seventh conduit 180 extends from the first conduit 115 to the fifth conduit 155. The connection between the first and seventh conduits 115, 180, located between the first air source 110 and the compressor 130, defines a flow joint 185. The first conduit 115, between the compressor 130 and the flow joint 185, may have a second valve 190 and the seventh conduit 180 may have a third valve 200. Under certain conditions, e.g., when the aircraft is the ground, the first air source 110 is ambient air, and the second air source 120 is not providing heated air (as non-limiting configurations), the cabin 25 may receive air directly from the first air source 110.

In one embodiment the first air source 110 of the first airflow 110A is RAM air, e.g., from the RAM air inlet 40. In one embodiment the first source 110 of the first airflow 110A is engine bleed air, e.g., from the engine 6. In one embodiment the first source 110 of the first airflow 110A is a mixture of RAM air and engine bleed air.

In one embodiment, the second air source 120 of the second airflow 110B is RAM air, e.g., from the RAM air inlet 40. In one embodiment, the second source 120 of the second airflow 110B is engine bleed air, e.g., from the engine 6. In one embodiment, the second source 120 of the second airflow 110B is recirculated cabin air, e.g., from the cabin 25.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

Those of skill in the art will appreciate that various example embodiments are shown and described herein, each having certain features in the particular embodiments, but the present disclosure is not thus limited. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

What is claimed is:

1. An environmental control system (ECS) of an aircraft, comprising:
   a heat exchanger;
   a compressor that receives a first airflow from a first air source, compresses the first airflow, and directs the first airflow to the heat exchanger;
   an axial flow turbine that receives a second airflow from a second air source, extracts energy from the second airflow, and directs the second airflow to the heat exchanger,
   wherein the heat exchanger directs the first airflow to a cabin of the aircraft and directs the second airflow overboard; and
   a shaft connected between the turbine and the compressor,
   wherein one of the first and second air sources is RAM air and the other of the first and second air sources is RAM air, recirculated cabin air, or engine bleed air or a mixture of RAM air and engine bleed air;
   wherein the system includes a turbine bypass branch, which includes a first valve, wherein the turbine bypass branch fluidly couples the second air source to the heat exchanger, bypassing the turbine,
   wherein the system includes a compressor bypass branch, which includes a second valve, wherein the compressor bypass branch fluidly couples the first air source to the cabin, bypassing the compressor and the heat exchanger,
   wherein the compressor is a centrifugal compressor and the turbine is an axial flow turbine.

2. The ECS of claim 1, including a motor connected to the shaft.

3. The ECS of claim 1, including:
   a first conduit coupled between the first air source and the compressor to direct the first airflow to the compressor;
   a second conduit coupled between the compressor and the heat exchanger to direct the first airflow from the compressor to the heat exchanger;
   a third conduit coupled between the second air source and the turbine to direct the second airflow to the turbine;
   a fourth conduit coupled between the turbine and the heat exchanger to direct the second airflow to the heat exchanger;
   a fifth conduit coupled to the heat exchanger to direct the first airflow from the heat exchanger to the cabin; and
   a sixth conduit coupled to the heat exchanger to direct the second airflow overboard.

* * * * *